US008355939B2

(12) United States Patent
Laur

(10) Patent No.: US 8,355,939 B2
(45) Date of Patent: Jan. 15, 2013

(54) MANAGING SUPPLY AND DEMAND FOR A WARE

(75) Inventor: Fabrice Laur, Heidelberg (DE)

(73) Assignee: SAP AG, Walldorf (DE)

( * ) Notice: Subject to any disclaimer, the term of this patent is extended or adjusted under 35 U.S.C. 154(b) by 1124 days.

(21) Appl. No.: 11/958,910

(22) Filed: Dec. 18, 2007

(65) Prior Publication Data

US 2009/0157474 A1 Jun. 18, 2009

(51) Int. Cl.
*G06Q 40/00* (2012.01)
(52) U.S. Cl. ................................ 705/7.11; 705/7.42
(58) Field of Classification Search ............. 705/7.11, 705/7.42
See application file for complete search history.

(56) References Cited

U.S. PATENT DOCUMENTS

| | | | | |
|---|---|---|---|---|
| 5,287,267 A * | 2/1994 | Jayaraman et al. | | 705/7.31 |
| 5,299,115 A * | 3/1994 | Fields et al. | | 705/7.22 |
| 5,369,570 A | 11/1994 | Parad | | |
| 5,459,656 A * | 10/1995 | Fields et al. | | 705/7.22 |
| 6,151,582 A * | 11/2000 | Huang et al. | | 705/7.25 |
| 6,415,260 B1 * | 7/2002 | Yang et al. | | 705/7.22 |
| 7,027,999 B2 * | 4/2006 | Smith et al. | | 705/7.31 |
| 7,516,084 B1 * | 4/2009 | Sankaran et al. | | 705/7.31 |
| 7,552,067 B2 * | 6/2009 | Nephew et al. | | 705/7.25 |
| 7,590,461 B2 * | 9/2009 | Milne et al. | | 700/95 |
| 7,606,743 B2 * | 10/2009 | Orzell et al. | | 705/28 |
| 7,610,212 B2 * | 10/2009 | Klett et al. | | 705/7.12 |
| 2002/0035537 A1 * | 3/2002 | Waller et al. | | 705/37 |
| 2003/0195791 A1 * | 10/2003 | Waller et al. | | 705/10 |
| 2003/0200150 A1 * | 10/2003 | Westcott et al. | | 705/26 |
| 2003/0233262 A1 * | 12/2003 | Chorely et al. | | 705/8 |
| 2004/0049415 A1 * | 3/2004 | Liou et al. | | 705/7 |
| 2004/0210467 A1 * | 10/2004 | Yokoyama | | 705/8 |
| 2005/0177465 A1 * | 8/2005 | Orzell et al. | | 705/28 |
| 2006/0069597 A1 * | 3/2006 | Wittrock | | 705/8 |
| 2008/0065407 A1 * | 3/2008 | Klett et al. | | 705/1 |
| 2009/0125385 A1 * | 5/2009 | Landvater | | 705/10 |

OTHER PUBLICATIONS

"Pegging Logic: Not Fixed (Follow MRP Logic)" [online]. SAP [no date], [retrieved on Dec. 18, 2007]. Retrieved from the Internet: <URL: http://help.sap.com/saphelp_dimp50/helpdata/EN/dd/fl493a7dc7f822e10000000a114084,content.htm">.
"Pegging" [online]. SAP [no date], [retrieved on Dec. 18, 2007]. Retrieved from the internet: <URL: http://help.sap.com/saphelp_di46c2/helpdata/EN/1d/e1073e254411d2b40c006094b9c9be/content.htm>.
"SAP Manufacturing: Manufacturing Planning—Production Planning and Scheduling" [online]. SAP [no date], [retrieved on Dec. 18, 2007]. Retrieved from the internet: <URL: http://www50.sap.com/businessmaps/0CA10EC69EDD4209918258122C9FFC7F.htm>.
"*Portfolio Enterprise Planning by Arthur: The Next Generation in Precision Planning*", JDA Portfolio*Enabled* Planning & Forecasting Soution, (Apr. 2005).

(Continued)

*Primary Examiner* — Thomas Dixon
*Assistant Examiner* — Benjamin S Fields
(74) *Attorney, Agent, or Firm* — Fish & Richardson P.C.

(57) ABSTRACT

Among other disclosed subject matter, a method for managing supply and demand for a ware includes obtaining requirement information for a ware, the requirement information representing a forecasted demand for the ware at a specified time. The method includes generating supply information for the ware, generating pegging information, obtaining order information for the ware, modifying the requirement information and updating the pegging information. Any remainder of the forecasted demand of the requirement information that is not consumed by the order remains associated with the supply information in the pegging information.

18 Claims, 4 Drawing Sheets

OTHER PUBLICATIONS

"Supply Chain Software: Review of i2's Business Content Libraries" [online] Supply Chain Digest Jul. 2006, [retrieved on Dec. 18, 2007]. Retrieved from the internet <URL: http://www.scdigest.com/Assets/Product_Reviews/07-06-11.php?cid=1082>.

*JD Edwards World Requirements Planning*, ORACLE Data Sheet (2004, 2005).

*Microsoft Business Solutions—Navision*, Microsoft Business Solutions (2004), p. 1-6.

*Oracle Manufacturing Material Planning for Process Manufacturing*, ORACLE Data Sheet (2006).

"Real time capable Wassermann software to plan pharmaceutical production and control processes" [online]. Wassermann AG, Aug. 20, 2007, [retrieved on Dec. 18, 2007]. Retrieved from the internet: <URL: http://www.wassermann.com/en/presse/pressemitteilungen/pm_2007/07_08_20_PM_boe...>.

\* cited by examiner

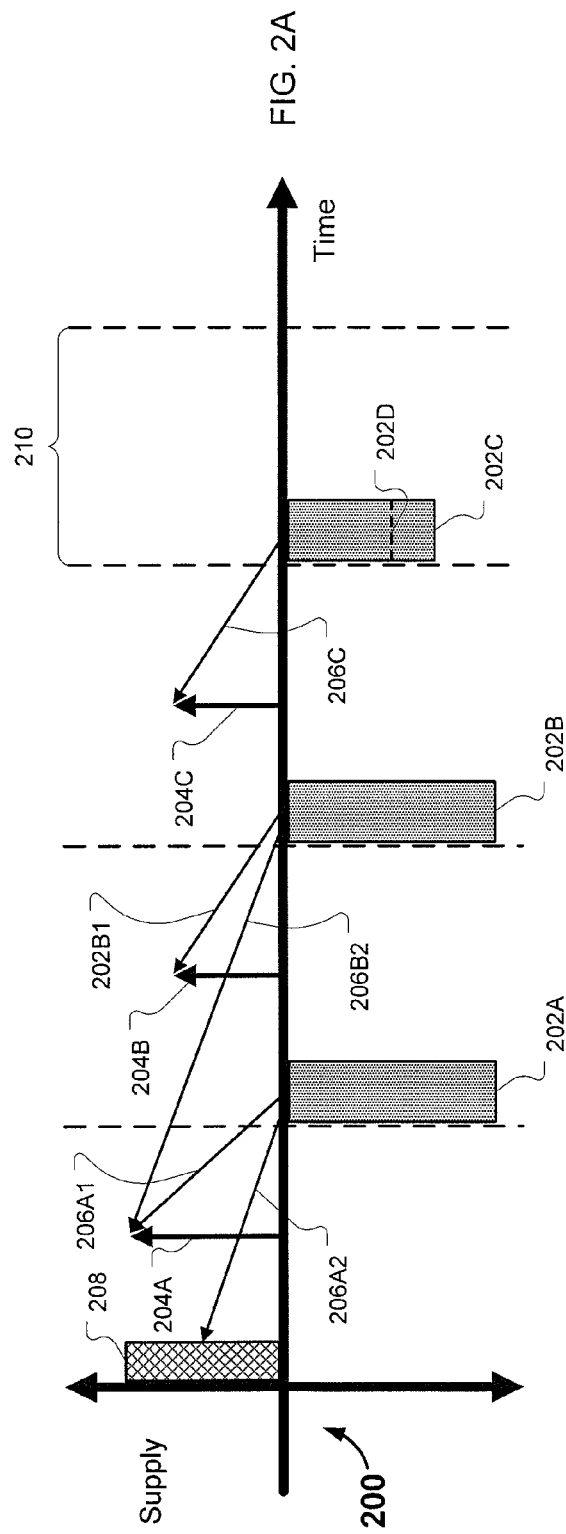
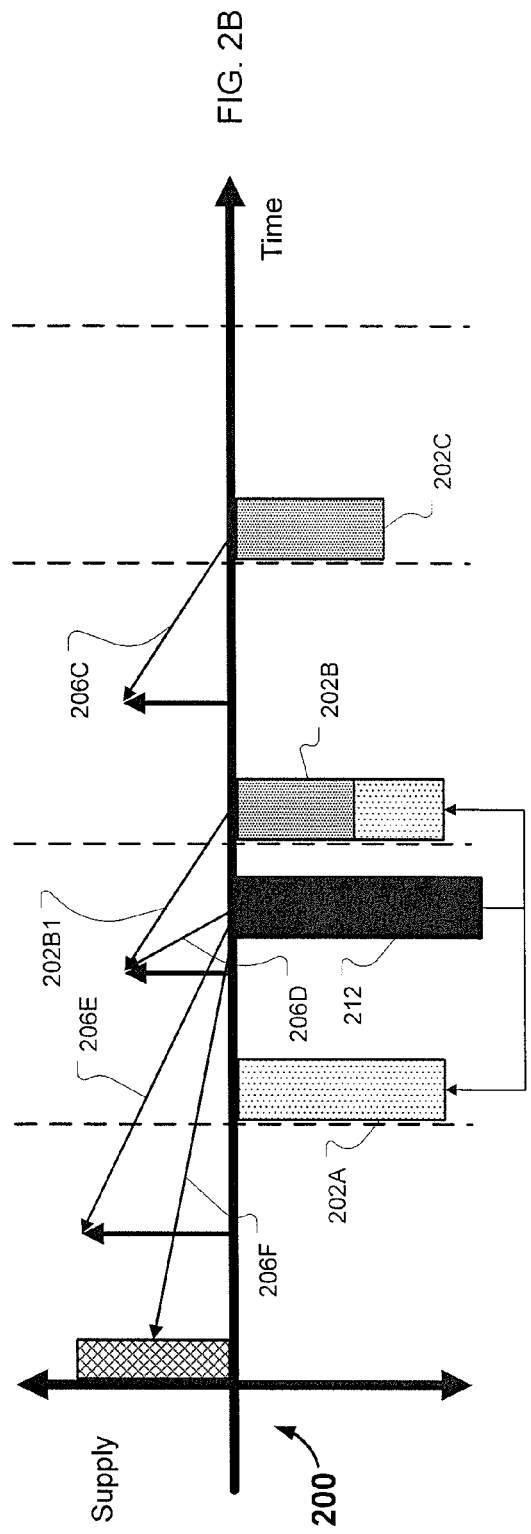

MANAGING SUPPLY AND DEMAND FOR A WARE

TECHNICAL FIELD

This document relates to managing supply and demand for a ware.

BACKGROUND

Organizations use computer-based systems to controls some aspects of supplying wares. For example, a supply chain management system can be used to plan and/or execute the manufacture or procurement of goods that are to be sold to customers. Such systems can allow certain aspects of the process to be scheduled and specified, such as the amount of goods needed, when the delivery should take place, what machinery or other resources are to be used, to name a few examples.

Some systems have separate planning components. For example, some products from SAP AG include a Materials Requirement Planning component that can be used to plan the requirements for one or more materials, such as a raw material or a product. The output of a planning component can be based on forecasts of what future demands will be, and the plan can then be used to organize, analyze and/or execute operations in the organizations. For example, a plan can be laid out ahead in time, and more specific requirements such as sales orders can be added to the plan to replace parts thereof as they become available.

SUMMARY

The invention relates to managing supply and demand for a ware.

In a first aspect, a computer-implemented method for managing supply and demand for a ware includes obtaining requirement information for a ware, the requirement information representing a forecasted demand for the ware at a specified time. The method includes generating supply information for the ware representing that a quantity of the ware is to be supplied. The method includes generating pegging information that associates the requirement information with the supply information. The method includes obtaining order information for the ware representing an order that matches the specified time and that comprises a demand for the ware. The method includes modifying the requirement information, in response to the order information, to indicate a consumption of the forecasted demand by the demand of the order. The method includes updating the pegging information, in response to the order information, to associate the order information with the supply information. Any remainder of the forecasted demand of the requirement information that is not consumed by the order remains associated with the supply information in the pegging information.

Implementations can include any, all or none of the following features. A consumption logic can perform the modification of the requirement information. A time scale for recording orders and requirements can be divided into time sections, and the consumption logic can provide that the order is attempted to be matched against any existing supplies in a priority order of: (1) first against any supply in a same time section as the order; (2) if no match is found in (1), thereafter against any supply in a time section adjacent the same time section as the order; and (3) if no match is found in (1) and (2), thereafter against any supply in a time section earlier than the same time section as the order. The updating of the pegging information can be based on the consumption logic. The method can further include obtaining a revision of the order information that changes an aspect of the order; and updating the pegging information according to the revision. The aspect of the order can be at least one selected from a delivery date of the order and a quantity of the ware demanded by the order. Generating the pegging information can include identifying the supply information, to which the requirement information is to be associated, by: identifying the supply information by searching, using the specified time, a time scale of supply dates in reverse chronological order starting at the specified time. The order information can fully consume the requirement information and updating the pegging information can include reassigning the pegging information from the requirement information to the order information. A time scale for recording orders and requirements can be divided into time sections, and the time scale can be configured to use only one requirement information for the ware per time section. The method can further include updating, using the obtained requirement information, an existing requirement information in one of the time sections to which the obtained requirement information applies. The existing requirement information can be associated with an existing supply information in an existing pegging information. The pegging information can indicate that the requirement information is associated with the supply information for an extent to which the existing supply information does not cover the forecasted demand for the ware. The method can further include providing a user with access to the order information, the access indicating the supply information as associated with the order information by the updated pegging information. The supply information can also be associated with another requirement information. The method can further include providing access to the other requirement information through the order information. The supply information may not fully cover the demand for the ware by the order, and the method can further include providing that the user can select to have at least some of the other requirement information consumed by the demand of the order. The ware can be at least one selected from a product and a service. The method can further include using the updated pegging information to control manufacture of the ware for the order according to the supply information.

In a second aspect, a computer program product is tangibly embodied in a computer-readable storage medium and includes instructions that when executed by a processor perform a method for managing supply and demand for a ware. The method includes obtaining requirement information for a ware, the requirement information representing a forecasted demand for the ware at a specified time. The method includes generating supply information for the ware representing that a quantity of the ware is to be supplied. The method includes generating pegging information that associates the requirement information with the supply information. The method includes obtaining order information for the ware representing an order that matches the specified time and that comprises a demand for the ware. The method includes modifying the requirement information, in response to the order information, to indicate a consumption of the forecasted demand by the demand of the order. The method includes updating the pegging information, in response to the order information, to associate the order information with the supply information. Any remainder of the forecasted demand of the requirement information that is not consumed by the order remains associated with the supply information in the pegging information.

Implementations can include any, all or none of the following features. The instructions that cause the modification of the requirement information can be included in a consumption logic. A time scale for recording orders and requirements can be divided into time sections, and the consumption logic can provide that the order is attempted to be matched against any existing supplies in a priority order of: (1) first against any supply in a same time section as the order; (2) if no match is found in (1), thereafter against any supply in a time section adjacent the same time section as the order; and (3) if no match is found in (1) and (2), thereafter against any supply in a time section earlier than the same time section as the order. The instructions that cause the updating of the pegging information can be based on the consumption logic.

In a third aspect, a computer system includes a planning module obtaining requirement information for a ware. The requirement information represents a forecasted demand for the ware at a specified time. The computer system includes a supply module generating supply information for the ware representing that a quantity of the ware is to be supplied. The computer system includes pegging logic generating pegging information that associates the requirement information with the supply information. The computer system includes an order module obtaining order information for the ware representing an order that matches the specified time and that comprises a demand for the ware. The computer system includes consumption logic modifying the requirement information, in response to the order information, to indicate a consumption of the forecasted demand by the demand of the order. The pegging logic updates the pegging information to associate the order information with the supply information, and provides that any remainder of the forecasted demand of the requirement information that is not consumed by the order remains associated with the supply information in the pegging information.

Implementations can provide any, all or none of the following advantages. A more efficient organization of supply and demand for a ware can be obtained. Pegging of ware requirements can be improved. Pegging logic can be coordinated with consumption logic. Order information can be pegged to the supply or supplies to which the requirement(s) consumed by the order were pegged. Order information can be pegged to a supply or supplies not planned to cover the sales order.

The details of one or more embodiments are set forth in the accompanying drawings and the description below. Other features and advantages will be apparent from the description and drawings, and from the claims.

DESCRIPTION OF DRAWINGS

FIGS. 2A-B show examples of requirement information, supply information and order information for a ware.

Like reference symbols in the various drawings indicate like elements.

DETAILED DESCRIPTION

Figure 1:
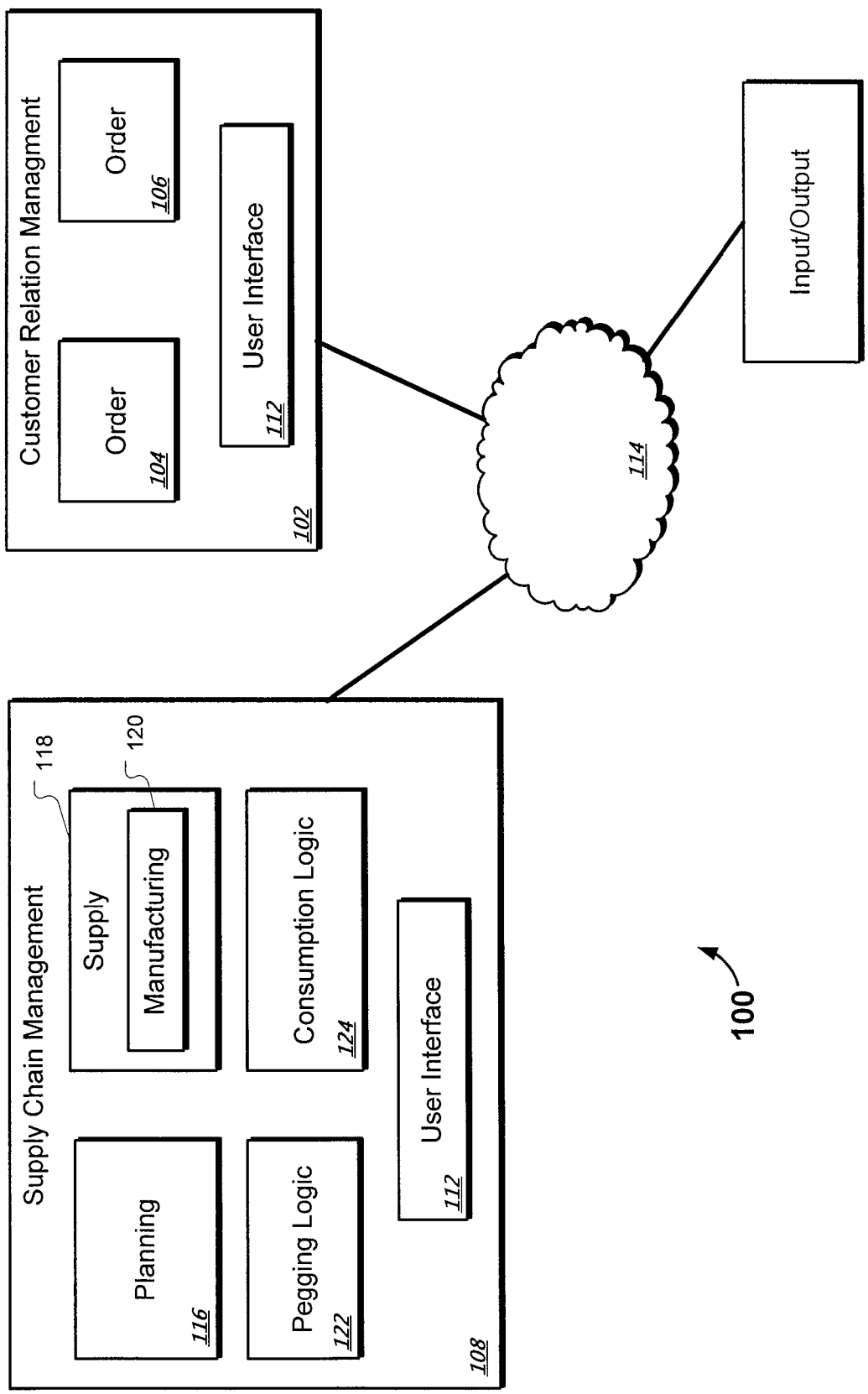
FIG. 1 shows an example of a system that can be used for managing supply and demand of a ware.

FIG. 1 shows an example of a system 100 that can be used for managing supply and demand of a ware. The system 100 here includes a customer relationship management (CRM) system 102 that can be used to manage customer relationships, for example by receiving and processing sales orders and managing correspondence relating to CRM. The CRM system here includes an order management module 104 that can be used to perform any or all aspects of order processing, such as providing that a sales representative (or someone else, such as the customer) can enter the necessary sales and customer information. The CRM system is here shown as including a single order 106 but in some implementations can be configured for receiving and processing many more orders, such as millions of orders or more. For example, the order module 104 can provide that the sales order be entered in terms of the product being ordered, how many units of the product are being sold, and the date when the product should be shipped. Thus, the system 100 can, for example through the order module 106, obtain order information for a ware representing an order that represents a demand for the ware at a specified time. Below will be described examples of associating either or both of the order information and a forecasted demand for the product with corresponding supply information about the product.

The above and other examples herein refer to products being supplied and/or demanded. Other wares than products can be considered as well. In some implementations, wares such as services can be supplied and/or demanded, for example in a computer system that schedules availability of consultants or other professionals. Thus, a ware can be either a product or a service, or both, to name some examples. Also, while in some examples it is described that products of one type are being demanded and supplied, in other implementations more than one type of product can be supplied, for example by a company having a manufacturing plant that makes many different products.

The system 100 here includes a supply chain management (SCM) system 108 that can be used to manage any or all aspects of the supply of a ware. For example, the SCM system can be used to forecast the need for products in the future and to schedule and execute the production or procurement of such products to meet requirements, such as from the forecasted demands or more concrete demands from actual sales orders. This processing and/or other processing can be performed either substantially without user input or output, such as in an essentially automated system. In other implementations, however, user input and/or output can be provided. Users can participate in sales order entry, forecasting scheduling or order execution, to name a few examples. Such participation can take place using one or more input/output devices 110, for example a display monitor and an input device such as a keyboard or mouse. For this and/or other purposes, the CRM system 102 and the SCM system 108 can be configured to generate one or more user interfaces 112 that can be output to the input/output device 110.

The CRM system 102, the SCM system 108 and/or the input/output device 110 can be connected using any kind of network 114, for example a local area network or the Internet. In some implementations, the input/output device 110 is a client device with regard to at least one of the CRM system 102 and the SCM system 108.

The SCM system 108 here includes a planning module 116 that can be used for planning a requirement for one or more wares. For example, a Materials Requirement Planning component available in products from SAP AG can be used for planning. The planning can involve making one or more forecasts of future demand for a product, such as by estimating a demand for a product six months or more into the future. The planning module 116 can take into account internal and/ or external information in such forecasting, for example by looking at the amounts of products supplied in the part, or the amount of orders received in the CRM module 102. Thus, the system 100 can, for example through the planning module 116, obtain requirement information for a ware representing a forecasted demand for the ware at a specified time.

The SCM system 108 here includes a supply module 118 that can be used for managing any or all aspects of the supply of one or more wares. The supply can involve scheduling a supply of a certain amount of the ware (e.g., a specified number of units of a product type to be delivered, or a specified amount of consultation time to be provided) at a particular time. For example, the supply module can schedule that 100 units of a product are to be manufactured in the month of April. Thus, the system can, for example through the supply module 118, generate supply information for a ware representing that a quantity of the ware is to be supplied.

The system 100 can initiate the execution of supplying a product. For example, the supply module 118 can access a manufacturing module 120 to initiate product manufacturing. The manufacturing module 120 can control a manufacturing plant, robotic machinery and/or other equipment to manufacture a specific number of products to be supplied. Thus, the system can, for example using the manufacturing module 120, control manufacture of the ware for the order according to supply information.

The system 100 here includes pegging logic 122 that can be used to associate requirements for a ware with planned supply for that ware. Such an association can be stored in form of pegging information in the system 100. For example, the pegging information can associate a forecasted demand for 100 units of a product with a planned supply of at least 100 units of the product. Thus, the system 100 can, for example using the pegging logic 122, generate pegging information that associates requirement information with supply information. Such an association can be useful, for example by indicating what requirement may have prompted a certain supply to be scheduled, or by indicating that the forecasted demand of a certain requirement is scheduled to be met by the planned output of a certain supply of product.

The system 100 here includes consumption logic 124 that can be used to associate sales order information with one or more existing requirements for a ware. Such an association can be stored in form of reducing an existing requirement for the ware by an amount corresponding to the demand of the order. In some implementations, the reduction can be considered as an at least partial consumption of the requirement information by the sales order, hence the name of the logic 124. Thus, the system 100 can, for example using the consumption logic 124, modify requirement information to indicate a consumption of a forecasted demand by the demand of an order.

When the forecasted demand of a requirement is partially or entirely consumed by a sales order, pegging information for at least that requirement can be updated accordingly. For example, an association between requirement information and supply information can be updated to also, or instead, associate the supply information with the sales order that in whole or in part consumed the requirement information. Any remainder of the forecasted demand of the requirement information that is not consumed by the order can remain associated with the supply information in the pegging information. In some implementations, then, the updating of the pegging information can be based on the consumption logic 124.

FIGS. 2A-B show examples of requirement information, supply information and order information for a ware. A time scale 200 here indicates time on a horizontal axis and supply (e.g., numbers of products or amount of consultant time) on a vertical axis. Forecasted demands for products are here illustrated as staples directed downward from the time axis (because a demand represents a potential decrease in the supply of the product). In this example, three exemplary requirements 202A-C are shown in the time scale. The height of each of the requirements 202A-C indicates the amount that is forecasted to be demanded. In other examples, more or fewer requirements can be included in the time scale. Thus, requirement information corresponding to the three requirements 202A-C can be generated by the planning module 116 and stored in the system 100, for example.

In contrast to the forecasted demands, scheduled supplies of product are indicated as arrows directed upward from the time axis (because a supply represents a potential increase in the available supply of the product). The time scale 200 here includes three exemplary supplies 204A-C. The height of each of the supplies 204A-C indicates the amount that is planned to be supplied. In other examples, more or fewer supplies can be included in the time scale. Thus, supply information corresponding to the three supplies 204A-C can be generated by the supply module 118 and stored in the system 100, for example.

Each of the requirements 202A-C is here "pegged" (i.e., connected) to one or more of the supplies 204A-C using pegs 206A-C. That is, the requirement 202C is pegged to the supply 204C using peg 206C; the requirement 202B is pegged to the supply 204B using peg 206B1 and to the supply 204B using peg 206B2; and the requirement 202A is pegged to the supply 204A using peg 206A 1 and also to a stock 208 using a peg 206A2. The stock 208 represents available product that has been supplied earlier; e.g., products in a warehouse that have been manufactured according to earlier supplies 204. Thus, while the stock 208 in this example is not explicitly referred to as a supply, it represents a supply of the ware that can be used to meet the demands of orders and/or other requirements.

Two or more pegs leading from a requirement (e.g., the pegs 202B1 and 202B2) indicate that this forecasted demand is to be met with two or more separate supplies. Similarly, two or more pegs leading to a supply (e.g., the pegs 206A1 and 206B2) indicate that this supply is scheduled to meet two or more separate requirements.

The time scale 200 can be divided into time sections 210. For example, each of the time sections 210 can represent a discrete amount of time from a fraction of a second to a day or a month or even a longer time period. In the illustrated example the time sections 210 are of equal length but in other implementations can have different lengths. In some implementations, the time scale is configured such that more than one requirement and/or supply can be included in any time section. In others, only one requirement 202 and/or supply 204 is used for each time section.

In any implementation, requirement information can be updated as needed. For example, assume that a requirement 202D were originally planned based on a forecasted demand, and that later this forecasted demand should be increased to reflect the additional expected demand. The existing requirement 202D can then be updated, based on the additional forecasted demand, resulting in the requirement 202C. The increase is here made in the requirement 202D (and not in any of the requirements 202B or C) because the additional forecasted demand was determined to apply to the time section of the requirement 202D. If the extra forecasted demand represented by the requirement 202C is covered by the same supply as the requirement 202D (i.e., the supply 204C), then the peg 206C can remain as the sole peg leading from the requirement 202C. In contrast, should the entire demand of the requirement 202C not be covered by the supply 204C, then the requirement 202C can have another peg (not shown) to another available supply. That is, the pegging information can indicate that the requirement information is associated with the supply information for an extent to which the existing supply information does not cover the forecasted demand for the ware.

Any of the pegs 206 can be generated by the pegging logic by starting with a given requirement and looking backward in time on the time scale 200 for an available supply of the ware. For example, the requirement 202B can be pegged by first creating the peg 206B2 to the supply 204A, to the extent ware supply is available from that supply, and then creating the peg 202B1 for any remainder of the forecasted demand of the requirement 202B that cannot be met by the supply 204A. Thus, the system 100 can, for example using the pegging logic 122, generate pegging information by identifying supply information using a search of a time scale of supply dates in reverse chronological order starting at the specified time for the requirement.

An example of receiving order information, and modifying requirement information and updating pegging information in response thereto, will now be described with reference also to FIG. 2B. Assume that the sales order 106 is received (e.g., using the order module 104). The sales order demands a certain amount of the ware to be delivered at a specific delivery date. The order represents an actual need for one or more of the supplies 204, at least in part, and/or a need for the stock 208. Therefore, the demand of the order will consume some of the forecasted demand of the requirements 204.

Here, order information 212 is entered in the time scale 200 in a same one of the time periods 210 as the existing requirement 202A. The time period can be chosen by the system 100, for example by the consumption logic 124. Moreover, the consumption logic can also be executed to determine which of the requirements 202 to be consumed. Here, the requirement 202A is consumed entirely, meaning that its forecasted demand is fully consumed by the actual demand of the order corresponding to order information 212. A portion of requirement 202B is also consumed by the order information 212, as indicated by the portion thereof that is not highlighted. Thus, in response to order information being obtained that comprises a demand for the ware, requirement information is modified in the above example to indicate a consumption of the forecasted demand by the demand of the order.

Some or all of the pegs 206 will be updated. In the system 100, for example, the pegging logic 122 can perform the updating. Here, the pegs 206A1 and 206A2, which used to lead from the requirement 202A, no longer appear after the updating. Instead, peg 206D leads from the order information 212 to the supply 204B, peg 206E to the requirement 204A and peg 206F to the stock 208. That is, the order information 212 is now pegged to requirements and stock, in this example, to cover the actual demand for the ware represented by the sales order. Moreover, because some of the forecasted demand of the requirement 202B is not consumed at this point, the peg 202B1 continues to lead from there to the supply 204B. However, the peg 202B1 in this example has been updated to indicate that this requirement covers less of the supply 204B than it did before, because some of that supply is now covered by the order information 212 as mentioned.

In some implementations, the updating of pegging information can proceed as follows. Consumption in full of the requirement 202A means that the sales information 212 should take over the pegs 206A1 and 206A2 of this requirement. The pegs 206E and 206F can then be generated by reassigning the pegs 206A1 and 206A2 from the requirement 202A to the order information 212. Thus, when the order information fully consumes the requirement information, the pegging information can be updated by reassigning the pegging information from the requirement information to the order information. The peg 202B1 can be split in two to generate the new peg 206D, which is assigned to the order information 212, and to allow the remainder of the peg 202B1 to continue leading from the requirement 202B to the supply 204B, albeit optionally indicating a reduced amount.

The recorded pegging information can be used for one or more purposes. For example, the pegs 206 can be reviewed by a user, such as a planner of materials requirements, to analyze the expected flow of material. This can be done by outputting some or all of the pegging information in human-understandable form, such as by making a graphical or tabular output using the user interface 112.

As another example, the pegging information can be used to control a manufacturing process. This can be done using the manufacturing module 120. For example, when the ware corresponding to the supplies 204A or 204B are to be manufactured in a plant, it can be determined that these supplies have the order information 212 pegged to them. Accordingly, the order information can be accessed by the manufacturing system and its contents can alter or control the process in any way. The sales order can indicate that the ware should be configured in a customer-specific way, or that the timeliness of the delivery is extra critical for this customer, to name just a few examples. Thus, the updated pegging information can be used to control manufacture of the ware for the order according to the supply information.

The particular supply with which a sales order is to be matched can be selected in different ways. Many different kinds of consumption logic can be used, and the ones described herein are a few examples thereof. In some implementations, the consumption logic 124 can provide that the order is attempted to be matched against any existing supplies in a priority order. Such a priority order can include (1) first attempting to match the order against any supply in a same time section as the order;

(2) if no match is found in (1), thereafter attempting to match the order against any supply in a time section adjacent the same time section as the order; and:

(3) if no match is found in (1) and (2), thereafter attempting to match the order against any supply in a time section earlier than the same time section as the order. When a suitable supply If no available supply has been identified after (1)-(3), no available supply or stock may exist. In such a situation, an output can be generated to a user. As another example, a new supply can automatically be generated, for example by the supply module 118.

The pegging information can be used to provide a user with access to supplies and/or requirement information. Such an access can serve many different purposes. For example, it can be possible for a user to look up the order information for a particular sales order, and from there navigate to one or more portions of supply information corresponding to that order. For example, a user can view the order information 212 in the user interface 212 and from there navigate to screens for any or all of the supplies 204A or 204B or to the stock 208. Accordingly, the access can indicate the supply information as being associated with the order information.

From a supply information, moreover, the user may be able to navigate to another requirement that is also pegged to that supply. For example, after navigating to the supply 204B, the user may also be able to navigate to the requirement 202B which is also pegged thereto. Thus, when the supply information is also associated with another requirement information, access can be provided to the other requirement information through the order information. Such a navigation may be undertaken for several reasons, for example to further analyze the material flow.

As another example, it can help the user address a shortage of supply for an actual demand. Assume, for example, that the sales order corresponding to the order information 212 should later be increased to demand a higher quantity of ware than originally. This can occur when a revision of the order information is obtained that changes an aspect of the order. In some implementations, the system can select quantity from a forecasted demand of any existing requirement that has not been consumed. As another example, however, it may be possible for the user to navigate to one or more requirements and select the one that is to be consumed to address the increased demand. For example, from the order information 212, which is to be increased in quantity, the user can navigate to the requirement 202B and analyze whether it should be (at least partially) consumed to address the shortage. Navigation to that other requirement information can be provided using the pegging information 206. Thus, when a supply information does not fully cover the demand for the ware by the order, the user can select to have at least some of another requirement information consumed by the demand of the order. The pegging information can then be updated according to the revision. Any aspect of an order can be changed, for example a delivery date of the order and/or a quantity of the ware demanded by the order.

Figure 3:
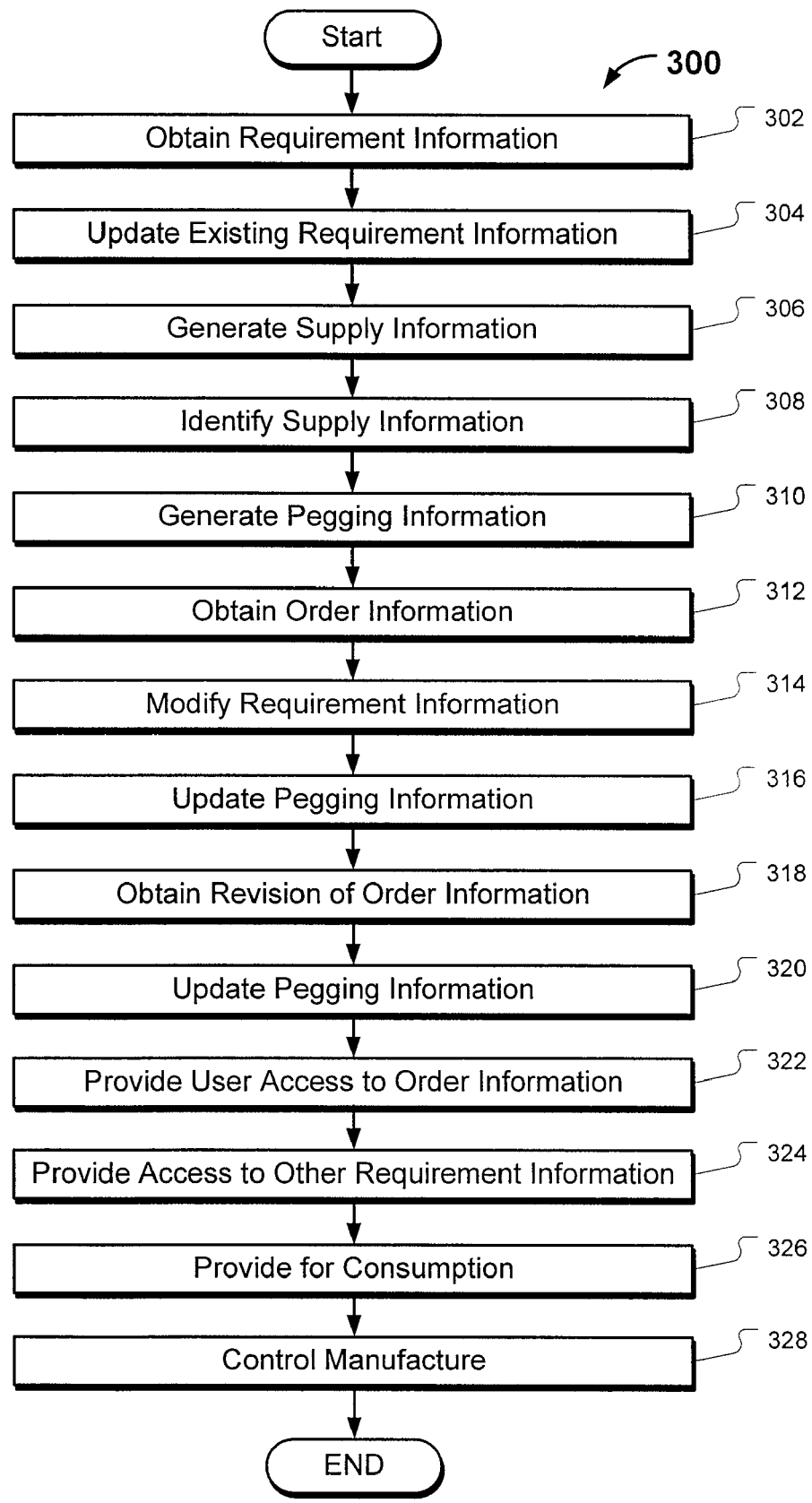
FIG. 3 shows an example of a method that can be performed for managing supply and demand of a ware.

FIG. 3 shows an example of a method 300 that can be performed for managing supply and demand of a ware. For example, the method 300 can be executed by a processor executing instructions stored in a computer-readable storage medium. In some implementations, the method 300 is performed in the system 100.

The method 300 includes, in step 302, obtaining requirement information for a ware, the requirement information representing a forecasted demand for the ware at a specified time. For example the requirement information 202 can be obtained from the planning module 116.

The method 300 includes, in step 304, updating, using the obtained requirement information, an existing requirement information in one of the time sections to which the obtained requirement information applies. The existing requirement information is associated with an existing supply information in an existing pegging information. For example, the requirement 202C can be obtained by updating the requirement 202D.

The method 300 includes, in step 306, generating supply information for the ware representing that a quantity of the ware is to be supplied. For example, the supply information 204 can be generated by the supply module 118.

The method 300 includes, in step 308, identifying the supply information by searching, using the specified time, a time scale of supply dates in reverse chronological order starting at the specified time. For example, the time scale 200 can be searched to identify any of the supply information 204.

The method 300 includes, in step 310, generating pegging information that associates the requirement information with the supply information. For example, pegging information 206 can be generated by pegging logic 122.

The method 300 includes, in step 312, obtaining order information for the ware representing an order that matches the specified time and that comprises a demand for the ware. For example, order information 212 can be obtained using the CRM system 102.

The method 300 includes, in step 314, modifying the requirement information, in response to the order information, to indicate a consumption of the forecasted demand by the demand of the order. For example, the requirements 202A or 202B can be modified by the consumption logic 124.

The method 300 includes, in step 316, updating the pegging information, in response to the order information, to associate the order information with the supply information. Any remainder of the forecasted demand of the requirement information that is not consumed by the order remains associated with the supply information in the pegging information. For example, the peg 206A1 can be reassigned to the order information 212.

The method 300 includes, in step 318, obtaining a revision of the order information that changes an aspect of the order. For example, the order information 212 can change in quantity or delivery date.

The method 300 includes, in step 320, updating the pegging information according to the revision. For example, some additional amount of the forecasted demand of the requirement 202B can be taken for the order information 212.

The method 300 includes, in step 322, providing a user with access to the order information. The access indicates the supply information as associated with the order information by the updated pegging information, and the supply information is also associated with another requirement information. For example, the user interface 112 can provide access to the order information 212, and can indicate that it is pegged to the supplies 204A and B and to the stock 208.

The method 300 includes, in step 324, providing access to the other requirement information through the order information. For example, the user can navigate from the order information 212 to the supply 204B and from there to the requirement 202B.

The method 300 includes, in step 326, providing that the user can select to have at least some of the other requirement information consumed by the demand of the order. For example, the requirement 202B can be consumed by the order information 212.

The method 300 includes, in step 328, using the updated pegging information to control manufacture of the ware for the order according to the supply information. For example, pegging information can be used to provide relevant specifications to the manufacturing module 120.

Figure 4:
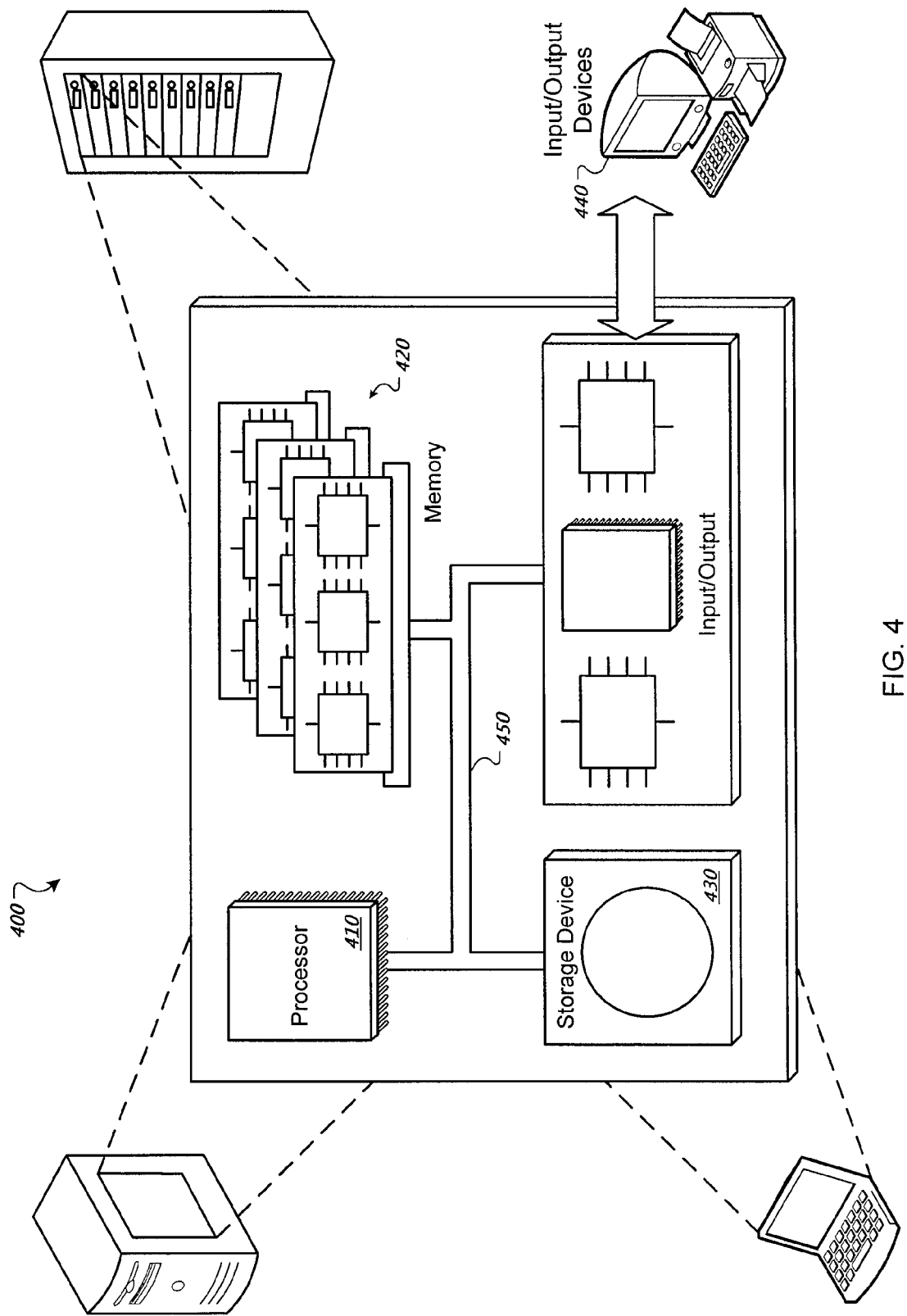
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for managing supply and demand for a ware, the method comprising:
    obtaining requirement information for a ware, the requirement information comprising a forecasted demand for the ware at a specified time;
    generating supply information for the ware representing that a quantity of the ware is to be supplied;
    generating initial pegging information that associates the forecasted demand with the supply information;
    obtaining order information for the ware, the order information comprising an actual demand for the ware and representing an order that matches the specified time;
    identifying, in response to the order information, a first portion of the forecasted demand that is consumed by the actual demand of the order, and a second portion of the forecasted demand that is not consumed by the actual demand of the order; and
    updating the initial pegging information to produce updated pegging information, including reassigning association with the supply information from the first portion of the forecasted demand to the order information comprising the actual demand, wherein association between the supply information and the second portion of the forecasted demand is maintained.

2. The computer-implemented method of claim 1, wherein a consumption logic identifies the first portion of the forecasted demand and the second portion of the forecasted demand.

3. The computer-implemented method of claim 2, wherein a time scale for recording orders and requirements is divided into time sections, and wherein the consumption logic provides that the order is attempted to be matched against any existing supplies in a priority order of:
    (1) first against any supply in a same time section as the order;
    (2) if no match is found in (1), thereafter against any supply in a time section adjacent the same time section as the order; and
    (3) if no match is found in (1) and (2), thereafter against any supply in a time section earlier than the same time section as the order.

4. The computer-implemented method of claim 2, wherein the updating of the initial pegging information is based on the consumption logic.

5. The computer-implemented method of claim 4, further comprising:
    obtaining a revision of the order information that changes an aspect of the order; and
    revising the updated pegging information according to the revision.

6. The computer-implemented method of claim 5, wherein the aspect of the order is at least one selected from a delivery date of the order and a quantity of the ware demanded by the order.

7. The computer-implemented method of claim 1, wherein generating the initial pegging information comprises identifying the supply information, to which the requirement information is to be associated, by:
identifying the supply information by searching, using the specified time, a time scale of supply dates in reverse chronological order starting at the specified time.

8. The computer-implemented method of claim 1, wherein a time scale for recording orders and requirements is divided into time sections, and wherein the time scale is configured to use only one requirement information for the ware per time section.

9. The computer-implemented method of claim 8, further comprising:
updating, using the obtained requirement information, an existing requirement information in one of the time sections to which the obtained requirement information applies, the existing requirement information associated with an existing supply information in an existing pegging information;
wherein the pegging information indicates that the requirement information is associated with the supply information for an extent to which the existing supply information does not cover the forecasted demand for the ware.

10. The computer-implemented method of claim 1, further comprising:
providing a user with access to the order information, the access indicating the supply information as associated with the order information by the updated pegging information, wherein the supply information is also associated with another requirement information; and
providing access to the another requirement information that comprises additional forecasted demand for the ware through the order information.

11. The computer-implemented method of claim 10, wherein the supply information does not fully cover the actual demand for the ware by the order, further comprising:
providing that the user can select to have at least some of the additional forecasted demand of the another requirement information consumed by the actual demand of the order.

12. The computer-implemented method of claim 1, wherein the ware is at least one selected from a product and a service.

13. The computer-implemented method of claim 1, further comprising:
using the updated pegging information to control manufacture of the ware for the order according to the supply information.

14. A computer program product tangibly embodied in a computer-readable storage medium comprising instructions that when executed by a processor perform a method for managing supply and demand for a ware, the method comprising:
obtaining requirement information for a ware, the requirement information comprising a forecasted demand for the ware at a specified time;
generating supply information for the ware representing that a quantity of the ware is to be supplied;
generating initial pegging information that associates the forecasted demand with the supply information;
obtaining order information for the ware, the order information comprising an actual demand for the ware and representing an order that matches the specified time;
identifying, in response to the order information, a first portion of the forecasted demand that is consumed by the actual demand of the order, and a second portion of the forecasted demand that is not consumed by the actual demand of the order; and
updating the initial pegging information to produce updated pegging information, including reassigning association with the supply information from the first portion of the forecasted demand to the order information comprising the actual demand, wherein association between the supply information and the second portion of the forecasted demand is maintained.

15. The computer program product of claim 14, wherein the instructions that cause the identification of the first portion of the forecasted demand and the second portion of the forecasted demand are comprised in a consumption logic.

16. The computer program product of claim 15, wherein a time scale for recording orders and requirements is divided into time sections, and wherein the consumption logic provides that the order is attempted to be matched against any existing supplies in a priority order of:
(1) first against any supply in a same time section as the order;
(2) if no match is found in (1), thereafter against any supply in a time section adjacent the same time section as the order; and
(3) if no match is found in (1) and (2), thereafter against any supply in a time section earlier than the same time section as the order.

17. The computer program product of claim 15, wherein the instructions that cause the updating of the initial pegging information are based on the consumption logic.

18. A computer system comprising:
a planning module obtaining requirement information for a ware, the requirement information comprising a forecasted demand for the ware at a specified time;
a supply module generating supply information for the ware representing that a quantity of the ware is to be supplied;
pegging logic generating initial pegging information that associates the forecasted demand with the supply information;
an order module obtaining order information for the ware, the order information comprising an actual demand for the ware and representing an order that matches the specified time;
consumption logic identifying, in response to the order information, a first portion of the forecasted demand that is consumed by the actual demand of the order, and a second portion of the forecasted demand that is not consumed by the actual demand of the order;
wherein the pegging logic updates the initial pegging information to produce updated pegging information, including reassigning association with the supply information from the first portion of the forecasted demand to the order information comprising the actual demand, wherein association between the supply information and the second portion of the forecasted demand is maintained.

* * * * *